US 8,922,912 B2

(12) United States Patent
Oi et al.

(10) Patent No.: US 8,922,912 B2
(45) Date of Patent: *Dec. 30, 2014

(54) FRESNEL LENS

(71) Applicant: Panasonic Corporation, Osaka (JP)

(72) Inventors: Kana Oi, Osaka (JP); Takayuki Nishikawa, Osaka (JP); Kimitake Okugawa, Osaka (JP); Akira Fukuoka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 8 days.

This patent is subject to a terminal disclaimer.

(21) Appl. No.: 13/749,767

(22) Filed: Jan. 25, 2013

(65) Prior Publication Data

US 2013/0141800 A1    Jun. 6, 2013

Related U.S. Application Data

(63) Continuation of application No. PCT/JP2011/071879, filed on Sep. 26, 2011.

(30) Foreign Application Priority Data

Sep. 27, 2010  (JP) ................. 2010-216197
Feb. 16, 2011  (JP) ................. 2011-031199
Sep. 14, 2011  (JP) ................. 2011-200320

(51) Int. Cl.
  *G02B 3/08*  (2006.01)
(52) U.S. Cl.
  CPC .................... *G02B 3/08* (2013.01)
  USPC ...................................... 359/742

(58) Field of Classification Search
  USPC ................................ 359/742, 457
  See application file for complete search history.

(56) References Cited

U.S. PATENT DOCUMENTS 4,787,722 A    11/1988    Claytor
(Continued)

FOREIGN PATENT DOCUMENTS

DE    69103707    4/1995
EP    0468410    1/1992
(Continued)

OTHER PUBLICATIONS

Hiroshi Kubota, "Optics", 12th edition, Iwanami Shoten Co., Apr. 9, 1986, pp. 282-283, with a partial English language translation thereof.
International Search Report and Written Opinion for PCT/JP2011/071879, dated Dec. 13, 2011, with an English language translation of ISR.

*Primary Examiner* — Jordan Schwartz
(74) *Attorney, Agent, or Firm* — Greenblum & Bernstein, P.L.C.

(57) ABSTRACT

A Fresnel lens comprises a first surface, and a second surface being the reverse side surface of the first surface and having a plurality of lens surfaces. Each lens surface is configured from a part of a side surface of an elliptical cone, which has an apex located on the second surface side and a bottom surface located on the first surface side. Here, in the Fresnel lens, any normal line intersecting with the lens surface configured from the part of the side surface of the elliptical cone among normal lines of respective points on the first surface is non-parallel to a central axis of the elliptical cone corresponding to the lens surface with which the any normal line intersects.

11 Claims, 9 Drawing Sheets

(56) References Cited

U.S. PATENT DOCUMENTS

| | | | |
|---|---|---|---|
| 5,054,905 A * | 10/1991 | Cohen | 351/159.42 |
| 5,138,495 A | 8/1992 | Shiono et al. | |
| 2005/0024746 A1* | 2/2005 | Shimura | 359/742 |
| 2005/0180014 A1* | 8/2005 | Nikolov et al. | 359/580 |

FOREIGN PATENT DOCUMENTS

| | | |
|---|---|---|
| JP | 03-186803 | 8/1991 |
| JP | 4-84103 | 3/1992 |
| JP | 07-36041 | 4/1995 |
| JP | 2003-004910 | 1/2003 |

* cited by examiner

FRESNEL LENS

RELATED APPLICATIONS

This application is a continuation application of International Application No. PCT/JP2011/071879, filed Sep. 26, 2011, the disclosure of which is incorporated by reference herein in its entirety.

TECHNICAL FIELD

The invention relates to a Fresnel lens.

BACKGROUND ART

There has been known an aplanatic lens, as an aberration-free lens (e.g., see Hiroshi Kubota, "Optics", 12th edition, Iwanami Shoten Co., Apr. 9, 1986, pp. 282-283).

In a lens with a lens surface 71 shown in FIG. 10, in order to collect a light beam Lb parallel to an optical axis $O_{pa}$ of the lens at a focal point F with a constant light path length, it is necessary to meet a condition of "RF=HF", where "R" denotes a refraction point in the lens surface 71, "H" denotes a point at the intersection the optical axis $O_{pa}$ with a perpendicular extending downward from the refraction point R (that is, a foot of a perpendicular extending toward the optical axis $O_{pa}$ from the refraction point R), "RF" denotes a light path length between the refraction point R and the focal point F, and "HF" denotes a light path length between the intersection point H and the focal point F. In order to meet the condition of "RF=HF", it is known that a hyperboloid or an ellipsoid is necessarily adopted as the lens surface 71. Here, in a case where the lens surface 71 is a hyperboloid, when a refraction index of a lens material is denoted by "n" and a back focus of the lens is denoted by "f", the lens surface 71 is represented by the following Formula (1).

[Math. 1]

$$\frac{(z-c)^2}{a^2} - \frac{x^2+y^2}{b^2} = 1 \quad \text{Formula (1)}$$

Here, Formula (1) is obtained when defining a rectangular coordinate system, in which the focal point F of the lens is employed as an origin, a z-axis is specified on the optical axis $O_{pa}$, a x-axis and a y-axis orthogonal to each other on any place surface orthogonal to the optical axis $O_{pa}$ are specified, and defining a coordinate of an arbitrary point on the lens surface 71 as (x, y, z). Then, a, b and c in Formula (1) are provided by the following Formula (2), Formula (3) and Formula (4), respectively.

[Math. 2]

$$a = \frac{f}{n+1} \quad \text{Formula (2)}$$

$$b = \sqrt{\frac{n-1}{n+1}} f \quad \text{Formula (3)}$$

$$c = \frac{n}{n+1} f \quad \text{Formula (4)}$$

Further, as shown in FIG. 11, there has been known a condenser lens 101, in which a rotation axis C of a hyperboloid 120 that is an emission surface (a second surface) is oblique to a normal line N of a plane surface 110 that is an incident surface (a first surface) so that an angle θ is formed by the rotation axis C and the normal line N (Japanese Examined Patent Publication No. 7-36041). In the condenser lens 101 having the configuration shown in FIG. 11, when a light beam is incident upon the condenser lens 101 with an angle δ formed by the light beam and the rotation axis C, the light beam becomes parallel to the rotation axis C of the hyperboloid 120, inside the condenser lens 101, and then is aplanatically collected on the focal point. F. When a refraction index of the condenser lens 101 is denoted by "n", the angle δ meets Snell's law, that is, sin(θ+δ)=n*sin θ. In this case, the hyperboloid 120 is represented by the abovementioned Formula (1), when defining a rectangular coordinate system, in which the focal point F is employed as an origin, a z-axis is specified on the rotation axis C of hyperboloid 120, a x-axis and a y-axis orthogonal to each other on any place surface orthogonal to the rotation axis C are specified.

Further, in the abovementioned Japanese Examined Patent Publication, as shown in FIGS. 12A and 12B, there has been proposed the condenser lens 101, which is a Fresnel lens, and in which the rotation axis C shared by hyperboloids 121, 122 and 123 of a second surface is oblique to the plane surface 110 of a first surface in order to suppress occurrence of an off-axis aberration. In this case, the respective hyperboloids 121, 122 and 123 configure lens surfaces.

The above-mentioned Japanese Examined Patent Publication describes that in the Fresnel lens 101 in FIGS. 12A and 12B an angle can be formed between a parallel light beam aplanatically collected on a focal point and a normal line N of the plane surface 110 according to an angle formed by the rotation axis C shared by the hyperboloids 121, 122 and 123 and the plane surface 110. Therefore, in the Fresnel lens 101 in FIGS. 12A and 12B, the occurrence of the off-axis aberration can be suppressed, and light beams from a direction oblique to the normal line N of the plane surface 110 can be effectively collected.

However, in the Fresnel lens 101 configured such that the rotation axis C of the hyperboloids 121, 122 and 123 configuring the emission surface is oblique to the normal line N of the plane surface 110 that is the incident surface, the hyperboloids 121, 122 and 123 are not rotationally symmetric with respect to the normal line N of the plane surface 110. Therefore, the Fresnel lens 101 or a metal mold for the Fresnel lens 101 is difficult to be produced by rotary forming with a lathe or the like.

So, when the Fresnel lens 101 or the metal mold for the Fresnel lens 101 is produced, it is necessary to use a multiaxis control processing machine and form the hyperboloids 121, 122 and 123 or respective curved surfaces by cutting at minute pitches while only a blade edge of a sharp cutting tool (tool) 130 with a nose radius (also referred to as a corner radius) of a few micro-meters is brought into point contact with a workpiece 140, as shown in FIG. 13. The workpiece 140 is a base material for directly forming the Fresnel lens 101, or a base material for forming the metal mold. Therefore, the processing time for producing the aforementioned Fresnel lens 101 or metal mold for the Fresnel lens 101 is increased, and then the cost of the Fresnel lens 101 is increased.

On the other hand, in a case where the cross-sectional shape of each lens surface in the cross-sectional shape including the normal line of the plane surface that is the incident surface of the Fresnel lens is linear, the lens surfaces or the curved surfaces corresponding to the lens surfaces can be formed by cutting while the cutting tool 130 is inclined with respect to the workpiece 140 so as to bring a side surface of a blade into line contact with the workpiece 140, as shown in FIG. 14, thus enabling significant reduction of the processing time. Here, in a Fresnel lens in which the shape of each lens surface in an emission surface is rotationally symmetric by employing a normal line of the incident surface as a rotation axis, it is known that each lens surface is approximated by a side surface of a frustum of cone, thereby enabling the cross-sectional shape of each lens surface to become linear (U.S. Pat. No. 4,787,722).

In the Fresnel lens 101 disclosed in the above-mentioned Japanese Examined Patent Publication and the Fresnel lens disclosed in the above-mentioned US patent, an intended light beam is infrared light, and these two documents disclose that polyethylene is used as a lens material.

Incidentally, in the Fresnel lens in which the shape of each lens surface in an emission surface is rotationally symmetric by employing the normal line of the incident surface as the rotation axis, in the lens surface being approximated by the side surface of the frustum of cone, an off-axis aberration occurs.

DISCLOSURE OF THE INVENTION

An object of the present invention is to provide a Fresnel lens, which is capable of suppressing occurrence of an off-axis aberration in a case of utilizing incident light obliquely incident upon a first surface from the outside world, and is capable of reducing the cost.

A Fresnel lens of the present invention comprises a first surface, and a second surface being the reverse side surface of the first surface and having a plurality of lens surfaces, wherein at least one of the plurality of lens surfaces is configured from a part of a side surface of an elliptical cone, and wherein any normal line intersecting with the lens surface configured from the part of the side surface of the elliptical cone among normal lines of respective points on the first surface is non-parallel to a central axis of the elliptical cone corresponding to the lens surface with which the any normal line intersects. In this configuration, the Fresnel lens can suppress occurrence of an off-axis aberration in a case of utilizing incident light obliquely incident upon the first surface from the outside world, and can reduce the cost.

In this Fresnel lens, preferably, at least two of the plurality of lens surfaces are configured from parts of side surfaces of elliptical cones having the different central axes respectively, and wherein as a lens surface among the at least two of the plurality of lens surfaces is located further outside, an angle formed by the normal line and the central axis of the elliptical cone corresponding to the lens surface becomes larger.

In this Fresnel lens, preferably, a lens surface located on a center among the plurality of lens surfaces is configured from a part of an aspheric surface with continuously changing curvature, and wherein any normal line intersecting with the lens surface that is located on the center and is configured from the part of the aspheric surface among the normal lines of the respective points on the first surface is non-parallel to an axis of symmetry of the aspheric surface corresponding to the lens surface located on the center with which the any normal line intersects.

In this Fresnel lens, preferably, the aspheric surface is a hyperboloid.

In this Fresnel lens, preferably, a lens material is polyethylene, and the first surface is a curved surface that is convex toward a side opposite to the second surface.

BRIEF DESCRIPTION OF THE DRAWINGS

Preferred embodiments of the invention will now be described in further details. Other features and advantages of the present invention will become better understood with regard to the following detailed description and accompanying drawings where.

Figure 1A:
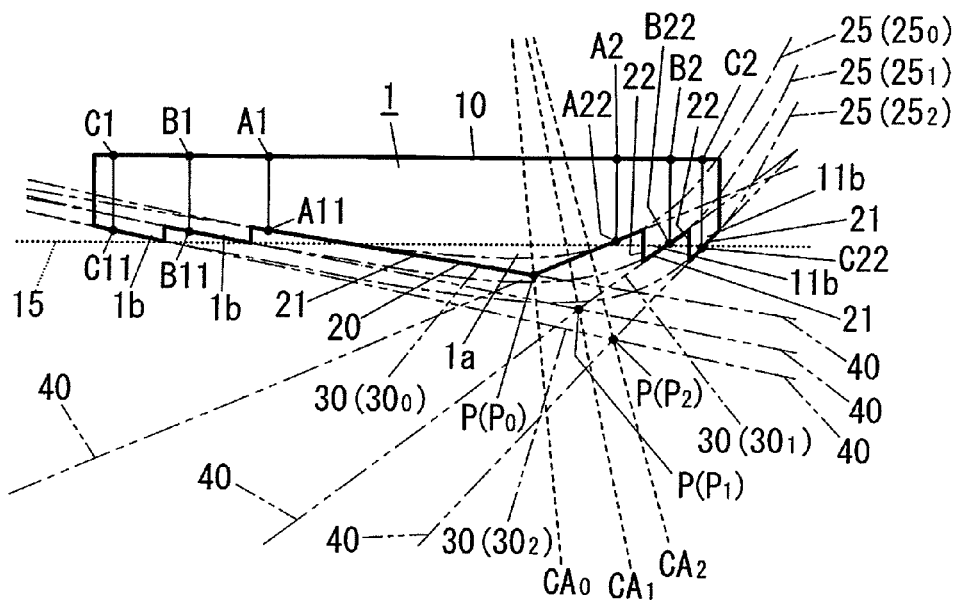
FIG. 1A is a cross-sectional view of a Fresnel lens according to Embodiment 1 of the present invention.

BEST MODE FOR CARRYING OUT THE INVENTION (Embodiment 1)

Hereinafter, a Fresnel lens according to the present embodiment will be described with reference to FIGS. 1A, 1B and 2.

A Fresnel lens 1 according to the present embodiment includes a first surface 10, that is a plane surface, and a second surface 20, that is the reverse side surface of the first surface 10 and has a plurality of lens surfaces 21 (three in an example shown in these figures). The Fresnel lens 1 has a central lens portion 1a, and a plurality of orbicular zone-shaped lens portions 1b (two in an example shown in these figures) surrounding the central lens portion 1a. The number of the orbicular zone-shaped lens portions 1b is not particularly limited, and three or more orbicular zone-shaped lens portions may be employed. The Fresnel lens 1 is a condenser lens in which the second surface 20, being the reverse side surface of the first surface 10, has the plurality of lens surfaces 21, and a lens surface 21 of the central lens portion 1a is a convex surface. In short, the Fresnel lens 1 is a condenser lens capable of reducing a thickness as compared with a thickness of a convex lens.

Each orbicular zone-shaped lens portion 1b has a mountain portion 11b on the second surface 20 side. Each mountain portion 11b has a rising surface (non-lens surface) 22 configured from a side surface on the central lens portion 1a, and the lens surface 21 configured from a side surface on a side opposite to the central lens portion 1a side. Therefore, the second surface 20 of the Fresnel lens 1 has the lens surfaces 21 of the respective orbicular zone-shaped lens portions 1b. Further, the second surface 20 of the Fresnel lens 1 also has the lens surface 21 of the central lens portion 1a. In FIG. 2B, when the first surface 10 is an incident surface and the second surface 20 is an emission surface, a traveling path of a light beam is represented by a thin solid line with an arrow. In the Fresnel lens 1 of the present embodiment, it is understood from FIG. 1B that a light beam incident, upon the first surface 10, from a direction oblique to a normal line of the first surface 10 of the Fresnel lens 1 is collected on the focal point F in the second surface 20 side of the Fresnel lens 1.

Incidentally, in the Fresnel lens 1, each lens surface 21 is configured from a part of a side surface of an elliptical cone 30. Then, any normal line intersecting with each lens surface 21 configured from a part of a side surface of an elliptical cone 30, among normal lines of respective points on the first surface 10, is non-parallel (that is, inclined) to a central axis of the elliptical cone 30 corresponding to the lens surface 21 with which the any normal line intersects. Here, each elliptical cone 30 has an apex P located on the second surface 20 side and a bottom surface (not shown) located on the first surface 10 side. In the Fresnel lens 1 of the present embodiment, the first surface 10 is the plane surface, and hence the central axes of the elliptical cones 30 are oblique to the normal lines of the respective points on the first surface 10. In a case where such a direction as to connect each point on the first surface 10 and an intersection at which the normal line of the point interests with the lens surface 21 is specified as a lens thickness direction, when the first surface 10 is the plane surface, a direction along the normal line of each point on the first surface 10 is the lens thickness direction. As a result, in each of FIGS. 1A and 1B, a vertical direction is the lens thickness direction. Accordingly, each lens surface 21 of the Fresnel lens 1 is configured from a part of a side surface of an elliptical cone 30 that has an apex P located on the second surface 20 side, a bottom surface located on the first surface 10 side, and a central axis oblique to the lens thickness direction. In a cross-sectional shape including one virtual straight line along the lens thickness direction (in this case, a cross-sectional shape including the normal lines of the first surface 10), an angle formed by a surface parallel to the first surface 10 and each lens surface 21 is an obtuse angle, and an angle formed by the surface parallel to the first surface 10 and each rising surface 22 is a substantially right angle.

In order to solve the problem, that is, to provide a Fresnel lens which can suppress occurrence of off-axis aberration in a case of utilizing incident light obliquely incident upon the first surface 10 from the outside world and reduce the cost, the present inventors have conceived as follows: That is, as to a standard structure in which the second surface 20 is configured from the respective parts of a plurality of the hyperboloids (one sheet of hyperboloid of two sheets) 25 having principal axes oblique to the normal lines of the first surface 10, the present inventors have conceived that, in a cross-sectional shape including one virtual straight line along the lens thickness direction, the aforementioned respective parts of the plurality of hyperboloids 25 are approximated by straight lines.

In each hyperboloid 25, collection of tangents of respective points on a cross-section orthogonal to the rotation axis of the hyperboloid 25 becomes a circular cone. Therefore, in a Fresnel lens configured such that each lens surface of the emission surface is rotationally symmetric employing the normal line of the incident surface as a rotation axis, each lens surface can be approximated by the part of the side surface of the circular cone.

In a rectangular coordinate system, in which a center of any plane surface is employed as an origin, an x-axis and a y-axis orthogonal to each other on the any plane surface are specified, and a z-axis orthogonal to the any plane surface is specified, assuming that (x, y, z) denote coordinates of any points of the circular cone, and b and c denote coefficients, the equation of the circular cone is represented by the following standard form, where the coefficient c is a constant irrelevant to z.

[Math. 3]

$$\frac{x^2+y^2}{b^2} - \frac{z^2}{c^2} = 0 \quad (b, c > 0)$$

Formula (5)

In a frustum of cone configured by cutting this circular cone by two surfaces parallel to an xy plane surface, the aforementioned parts of the respective hyperboloids 25 in the above-mentioned standard structure cannot be approximated.

On the other hand, in each hyperboloid 25, collection of tangents 40 of respective points on a cross-section not perpendicular to the rotation axis of the hyperboloid 25 becomes an elliptical cone. Here, the present inventors have focused on the fact that in the hyperboloids 25 having the above-mentioned structure can be approximated by the elliptical cones 30 coming in contact with the hyperboloids 25 on the respective points on the lines of intersection of the plane surfaces oblique to the principal axes of the hyperboloids 25 and the hyperboloids 25. Then, the present inventors have conceived that the lens surfaces 21 are configured from the parts of the side surfaces of the elliptical cones 30 that have apexes P located on the second surface 20 side, bottom surfaces (not shown) located on the first surface 10 side, and central axes (not shown) oblique to the lens thickness direction.

Figure 1B:
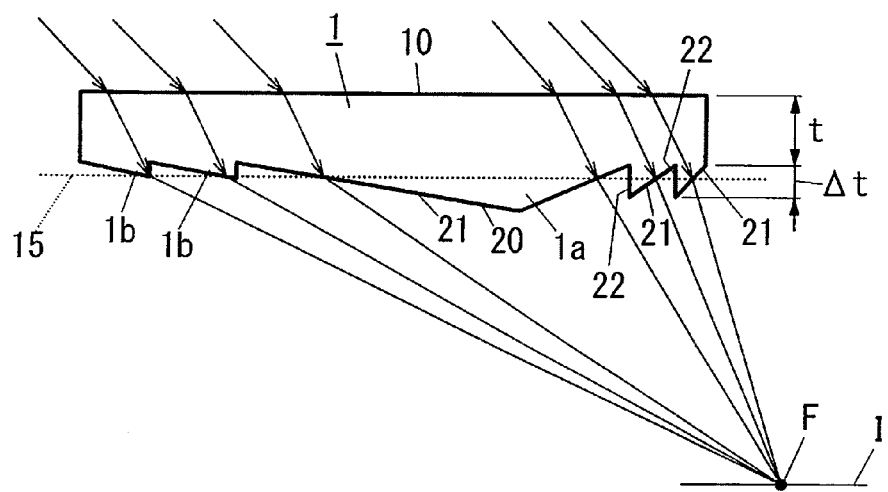
FIG. 1B is an explanatory diagram of a traveling path of a light beam in the Fresnel lens according to Embodiment 1 of the present invention.
Figure 2:
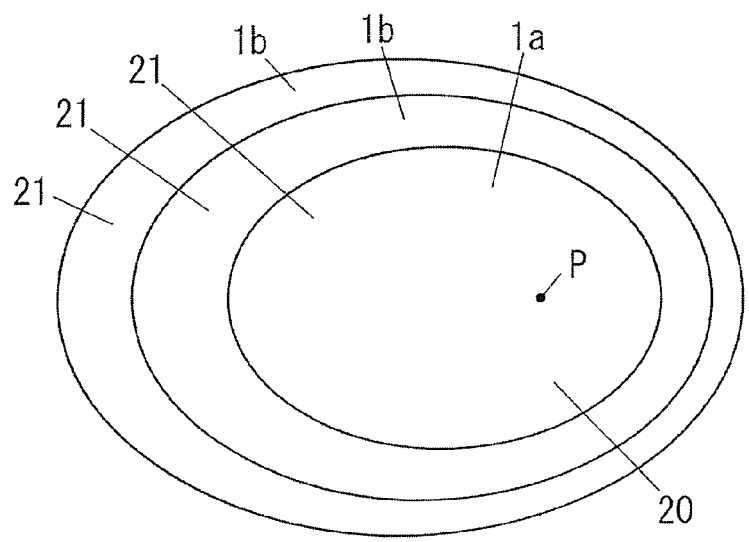
FIG. 2 is a plan view of the Fresnel lens according to Embodiment 1 of the present invention.

In the Fresnel lens 1 shown in FIGS. 1A and 1B, when focusing on the lens surfaces 21 configured from the parts of the respective elliptical cones 30, since the elliptical cones 30 have the hyperboloids 25 inscribed in the elliptical cones 30, and inclinations of both of the tangents of the respective points on the lines of intersection of the elliptical cones 30 and the hyperboloids 25 coincide with each other, light beams passing through the respective points on the lines of intersection of the elliptical cones 30 and the hyperboloids 25 are collected on a single point on the rotation axis of the hyperboloids 25. In the Fresnel lens 1 of the present embodiment, at least one of the plurality of lens surfaces 21 is configured so as to have a shape in which a part of the elliptical cone 30 is cut off so as to include the line of intersection of the elliptical cone 30 and the hyperboloid 25, thereby being capable of suppressing occurrence of off-axis aberrations in a case of utilizing incident light obliquely incident upon the first surface 10 from the outside world and reducing the cost. Here, in the Fresnel lens 1, the lower a height of the mountain portion 11b is, the more easily light beams passing through this mountain portion 11b are collected on a single point, and hence the line of intersection of the elliptical cone 30 and the hyperboloid 25 inscribed in the elliptical cone 30 is preferably intersect with the mountain portion 11b.

The height of each mountain portion 11b and a space between the apexes of the adjacent mountain portions 11b need to be set at a value which is more than or equal to a wavelength of an electromagnetic wave that is an object to be collected in the Fresnel lens 1. For example, in a case where infrared light with a wavelength of 10 μm is an object to be collected, the height of each mountain portion 11b and the space between the apexes of the adjacent mountain portions 11b need to be 10 μm or more. On the other hand, in the Fresnel lens 1, it is conceivable to cause a problem that the larger the height of each mountain portion 11b and the space between the apexes of the adjacent mountain portions 11b are, the larger the off-axis aberrations are, and a problem that lens patterns can be visually recognized from the first surface 10 side. Therefore, in a case where an allowable value (target value) of an off-axis aberration is, for example, less than or equal to 0.6*0.6 mm which is the size of the infrared photoelectric conversion element arranged on the focal point F, the Fresnel lens 1 is preferably configured such that a maximum height of the mountain portion 11b is 150 μm or less. In addition, in a case where it is required that the lens patterns on the second surface 20 side is unable to be visually recognized when unintentionally viewed from a place separated from the first surface 10 by 30 cm, the Fresnel lens 1 is preferably configured such that the space between the adjacent mountain portions 11b is 0.3 mm or less. On the other hand, the smaller the space between the adjacent mountain portions 11b is, the larger the number of the mountain portions 11b is, and hence the space between the adjacent mountain portions 11b is preferably set in a range of, for example, 0.1 to 0.3 mm.

In the Fresnel lens 1 according to the present embodiment, the lines of intersection of the elliptical cones 30 and the hyperboloids 25 inscribed in the elliptical cones 30 exist on a plane surface 15 which is orthogonal to the lens thickness direction (that is, parallel to the first surface 10 configured from the plane surface), and which has a height from a valley of the mountain portion 11b of each orbicular zone-shaped lens portion 1b that is a half of the maximum height of the mountain portion 11b. Therefore, in the Fresnel lens 1 according to the present embodiment, light beams passing on the intersections of the lens surfaces 21 and the plane surface 15 are collected on the focal point F, as shown in FIG. 1B.

In a rectangular coordinate system, in which a center of any plane surface is employed as an origin, an x-axis and a y-axis orthogonal to each other on the any plane surface are specified, and a z-axis orthogonal to the any plane surface is specified, assuming that (x, y, z) denote coordinates of any points of the elliptical cone, and a, b and c denote coefficients, the general equation of the elliptical cone is represented by the standard form of following Formula (6), where the coefficient c is a constant irrelevant to z.

[Math. 4]

$$\frac{x^2}{a^2} + \frac{y^2}{b^2} - \frac{z^2}{c^2} = 0 \quad \text{Formula (6)}$$

$$(a \neq b \text{ and } a, b, c > 0)$$

Hereinafter, for convenience of description, the Fresnel lens 1 in FIGS. 1A and 1B will be described by denoting the three elliptical cones 30 with different reference numerals respectively. The elliptical cone corresponding to the central lens surface 21 is represented as an elliptical cone $30_0$, the elliptical cone corresponding to the lens surface 21 that is a first orbicular zone closest to the central lens surface 21 is represented as an elliptical cone $30_1$, and the elliptical cone corresponding to the lens surface 21 that is a second orbicular zone second closest to the central lens surface 21 is represented as an elliptical cone $30_2$. In short, among the elliptical cones 30 except the elliptical cone 30 corresponding to the central lens surface 21, the elliptical cone corresponding to the lens surface 21 that is an n-th (n>=1) orbicular zone counting from a side closer to the central lens surface 21 is represented as an elliptical cone $30_n$. Here, the respective apexes P of the elliptical cones $30_0$, $30_1$ and $30_2$ are represented as apexes $P_0$, $P_1$ and $P_2$, and the respective central axes of the elliptical cones $30_0$, $30_1$ and $30_2$ are denoted by $CA_0$, $CA_1$, and $CA_2$. In short, the apex of the elliptical cone $30_n$ corresponding to the lens surface 21 that is the n-th orbicular zone is denoted by $P_n$, and the central axis of the elliptical cone $30_n$ is denoted by $CA_n$. As to the elliptical cones $30_0$, $30_1$ and $30_2$, rectangular coordinate systems, in which the apexes $P_0$, $P_1$ and $P_2$ are employed as origins, the central axes $CA_0$, $CA_1$, and $CA_2$ are employed as z-axes, x-axes are specified along major axis directions of ellipses in cross-section perpendicular to the z-axis, and y-axes are specified along minor axis directions, are defined. Then, a Formula of each of the elliptical cones $30_0$, $30_1$ and $30_2$ can be represented by the above-mentioned Formula (6) in each rectangular coordinate system. Further, in FIGS. 1A and 1B, the hyperboloids 25 inscribed in the elliptical cones $30_0$, $30_1$ and $30_2$ are represented by hyperboloid $25_0$, $25_1$ and $25_2$, respectively.

As an example of the Fresnel lens 1, a lens including six lens surfaces 21 each configured from a part of a side surface of an elliptical cone 30 is exemplified. In this Fresnel lens 1, among the six elliptical cones 30, the elliptical cone corresponding to the central lens surface 21 is represented as an elliptical cone $30_0$, and the elliptical cones corresponding to the lens surfaces 21 that are a first orbicular zone to a fifth orbicular zone are represented as elliptical cones $30_1$ to $30_5$, respectively. In the Fresnel lens 1 of this example, in a case where a thickness t of a base portion configured from a portion other than each mountain portion 11b is 0.5 mm, a height (lens step) Δt of the mountain portion 11b on a point closest to a focal point F in each orbicular zone-shaped lens portion 1b is 0.05 mm, and polyethylene with a refractive index of 1.53 is employed as a lens material, values of coefficients a, b and c in Formula (6) are shown in the following Table 1. However, the coefficients a, b and c shown in Table 1 are values obtained under a precondition that a distance from an image surface I parallel to the first surface 10 of the Fresnel lens 1 to the first surface 10 is 5.5 mm, and light beams incident at an incident angle of 45 degrees are collected on the focal point F.

TABLE 1

| Lens Surface | Coefficient a | Coefficient b | Coefficient c |
| --- | --- | --- | --- |
| Elliptical Cone $30_0$ | 46.28 | 32.81 | 1.71 |
| Elliptical Cone $30_1$ | 19.29 | 13.83 | 1.72 |
| Elliptical Cone $30_2$ | 12.67 | 9.24 | 1.73 |
| Elliptical Cone $30_3$ | 10.11 | 7.49 | 1.74 |
| Elliptical Cone $30_4$ | 8.66 | 6.50 | 1.75 |
| Elliptical Cone $30_5$ | 7.68 | 5.85 | 1.76 |

The central axes of the lens surfaces 21 of the second surface 20 with which the normal lines intersect are inclined with respect to the normal lines of the respective points on the first surface 10. Hereinafter, for convenience of description, in the Fresnel lens 1 in FIGS. 1A and 1B, the intersections of the respective normal lines of points A1, A2, B1, B2, C1 and C2 on the first surface 10 and the second surface 20 are referred to as A11, A22, B11, B22, C11 and C22, and the respective normal line of the points A1, A2, B1, B2, C1 and C2 on the first surface 10 are referred to as A1-A11, A2-A22, B1-B11, B2-B22, C1-C11 and C2-C22. Here, $\theta_0$ denotes an angle formed by each of the normal lines A1-A11 and A2-A22 intersecting with the central lens surface 21, and the central axis $CA_0$ of the elliptical cone $30_0$, $\theta_1$ denotes an angle formed by each of the normal lines B1-B11 and B2-B22 intersecting with the lens surface 21 which is the first orbicular zone closest to the central lens surface 21, and the central axis $CA_1$ of the elliptical cone $30_1$, and $\theta_2$ denotes an angle formed by each of the normal lines C1-C11 and C2-C22 intersecting with the lens surface 21 which is the second orbicular zone second closest to the central lens surface 21, and the central axis $CA_2$ of the elliptical cone $30_2$. Similarly, assuming that $\theta_3$ denotes an angle formed by the normal line intersecting with the lens surface 21 which is the third orbicular zone, and the central axis $CA_3$ of the elliptical cone $30_3$, $\theta_4$ denotes an angle formed by the normal line intersecting with the lens surface 21 which is the fourth orbicular zone, and the central axis $CA_4$ of the elliptical cone $30_4$, and $\theta_5$ denotes an angle formed by the normal line intersecting with the lens surface 21, which is the fourth orbicular zone, and the central axis $CA_5$ of the elliptical cone $30_5$, values of $\theta_0$ to $\theta_5$ are shown in the following Table 2.

TABLE 2

| | |
|---|---|
| $\theta_0$ | 0.15° |
| $\theta_1$ | 0.84° |
| $\theta_2$ | 1.89° |
| $\theta_3$ | 2.89° |
| $\theta_4$ | 3.84° |
| $\theta_5$ | 4.75° |

It is understood from Table 2 that in the Fresnel lens 1, the angle, which is formed by a normal line of each point on the first surface 10 and a central axis of a lens surface 21 of the second surface 20 with which the normal line intersects, becomes larger as a orbicular zone-shaped lens portion 1b is located further outside.

Figure 3:
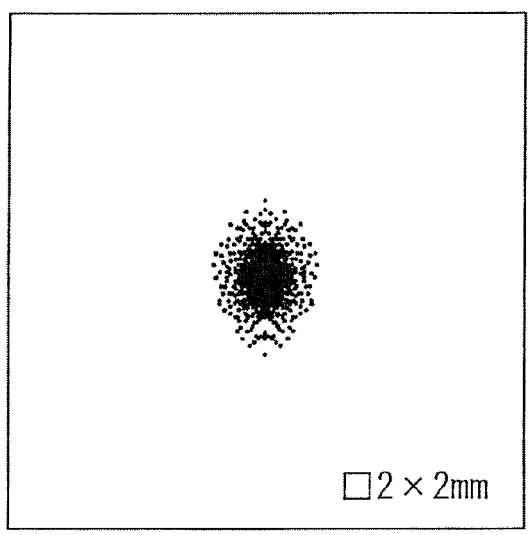
FIG. 3 is a spot diagram of the Fresnel lens according to Embodiment 1 of the present invention.

FIG. 3 shows a spot diagram on the focal point F of this Fresnel lens 1. FIG. 3 shows a spot diagram in the range of 2*2 mm employing the focal point F as a center. The size of a focal spot should be less than or equal to the size of the photoelectric conversion element arranged so as to correspond to the focal point F of the Fresnel lens 1 (here, 0.6*0.6 mm or less).

Figure 14:
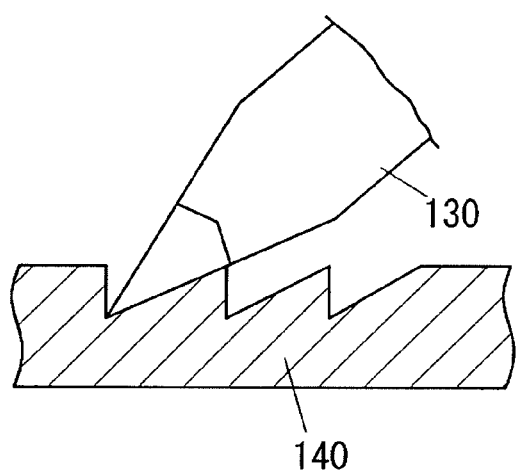
FIG. 14 is an explanatory diagram of a method of producing a Fresnel lens of yet another conventional example.

In the Fresnel lens 1 according to the present embodiment, in the cross-sectional shape including one virtual straight line along the lens thickness direction (in this case, a cross-sectional shape including the normal lines of the first surface 10), the respective lens surfaces 21 are straight lines, and hence it is possible to form the lens surfaces 21 or curved surfaces according to the lens surfaces 21 by cutting while a cutting tool 130 is inclined with respect to a workpiece 140 (base material for forming directly the Fresnel lens 1, or base material for forming a metal mold) so as to bring a side surface of a blade into line contact with the workpiece 140, as shown in FIG. 14. Therefore, in the Fresnel lens 1 according to the present embodiment, when the Fresnel lens 1 or the metal mold for the Fresnel lens 1 is produced, the processing time for producing the workpiece 140 by the cutting tool 130 can be reduced. The lens material of the Fresnel lens 1 may be selected as someone thinks fit, according to wavelengths of light beams or the like. For example, the lens material may be selected from plastic (e.g., polyethylene, acrylic resin or the like), glass, silicon, germanium or the like as someone thinks fit. Further, for example, when the wavelengths of light beams are within the infrared wavelength region, the lens material should be selected from polyethylene, silicon, germanium or the like. When the wavelengths of light beams are within the visible-light wavelength region, the lens material should be selected from acrylic resin, glass, or the like. The material of the metal mold is not particularly limited, and phosphor bronze or the like can be employed, for example. When the Fresnel lens 1 is formed using the metal mold, the injection molding method, the compression molding method, or the like may be employed, for example.

As explained above, in the Fresnel lens 1 according to the present embodiment, the first surface 10 is a plane surface, and the second surface 20 has the plurality of lens surfaces 21, and then each lens surface 21 is configured from a part of a side surface of an elliptical cone 30, which has an apex P located on the second surface 20 side, a bottom surface located on the first surface 10 side and a central axis oblique to the lens thickness direction. Here, in the Fresnel lens 1 according to the present embodiment, any normal line intersecting with each lens surface 21 configured from a part of a side surface of an elliptical cone 30, among normal lines of respective points on the first surface 10, is non-parallel to a central axis of the elliptical cone 30 corresponding to the lens surface 21 with which the any normal line intersects. Thus, the Fresnel lens 1 according to the present embodiment can suppress occurrence of off-axis aberrations in a case of utilizing incident light obliquely incident upon the first surface 10 from the outside world and reduce the cost. In addition, at least one of a plurality of lens surfaces 21 is configured from a part of a side surface of an elliptical cone 30, and thereby the Fresnel lens 1 can suppress occurrence of off-axis aberrations in a case of utilizing incident light obliquely incident upon the first surface 10 from the outside world and reduce the cost.

Figure 4A:
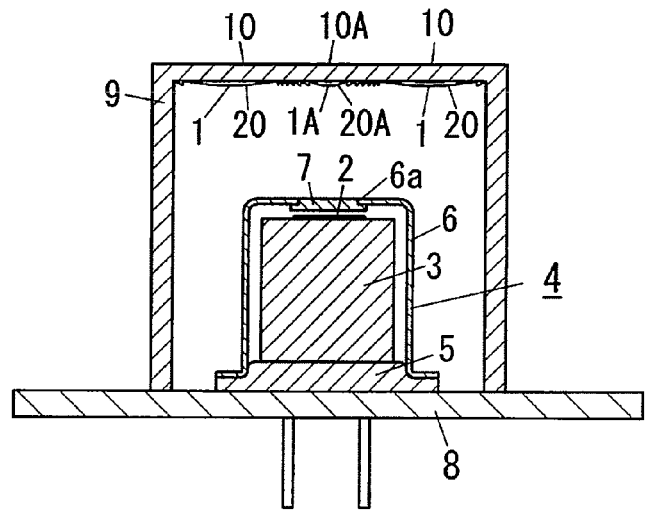
FIG. 4A is a schematic cross-sectional view showing applications for the Fresnel lens according to Embodiment 1 of the present invention.
Figure 4B:
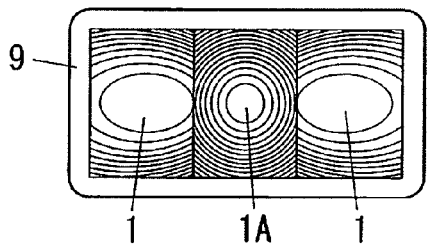
FIG. 4B is a schematic bottom plan view of a main section showing applications for the Fresnel lens according to Embodiment 1 of the present invention.
Figure 4C:
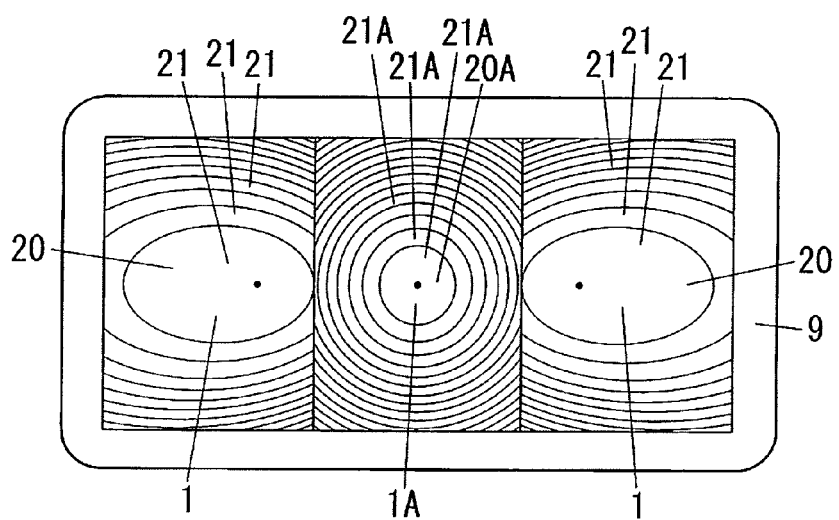
FIG. 4C is an enlarged view of FIG. 4B.

As applications for the above-mentioned Fresnel lens 1, for example, a sensor device is shown in FIGS. 4A, 4B and 4C. In this sensor device, a package 4 is mounted on a circuit board 8 configured from a printed-wiring board. This package 4 is configured by a disk-shaped stem 5, a closed-bottomed cylindrical cap 6 connected to the stem 5, and a light beam transmitting member 7 arranged so as to close an opening 6a formed on a bottom of this cap 6 and having a function of transmitting desired light beam. Here, the package 4 houses an element holding member (e.g., MID board or the like) 3 that holds a photoelectric conversion element 2. Then, in the sensor device, a cover member 9 is provided with a multi-segment lens, which is configured by three Fresnel lenses 1, 1A and 1, and is located on one surface side of the circuit board 8 so as to cover the package 4. In this case, an infrared sensor element such as a pyroelectric element, or a light receiving element such as a photodiode can be adopted as the photoelectric conversion element 2. When the infrared sensor element is adopted as the photoelectric conversion element 2, a silicon substrate, a germanium substrate or the like is preferably adopted as the light beam transmitting member 7.

In a Fresnel lens 1A arranged on the center of the multi-segment lens, each lens surface 21A in a second surface 20A is configured from a part of a side surface of a circular cone, which has an apex (not shown) located on the second surface 20A side, a bottom surface (not shown) located on a first surface 10A side, and a central axis coinciding with a normal line of a center of the first surface 10A. Therefore, the multi-segment lens can be provided at low cost. For example, when the infrared sensor element is adopted as the photoelectric conversion element 2, the infrared sensor having a wide angle of view can be achieved as the sensor device.

The number of the Fresnel lenses 1, 1A in the multi-segment lens is not particularly limited.

(Embodiment 2)

Hereinafter, a Fresnel lens according to the present embodiment will be described with reference to FIGS. 5A and 5B.

A basic configuration of a Fresnel lens 1 according to the present embodiment is substantially similar to that of Embodiment 1, the difference therebetween being in that a lens surface 21 located on a center, among a plurality of lens surfaces 21, is configured from a part of a hyperboloid 25 in which a rotation axis is inclined with the lens thickness direction and which is an aspheric surface with continuously changing curvature. In addition, the constituent elements similar to those of Embodiment 1 are assigned with same reference numerals and the explanation thereof is herein omitted.

Similarly to the Fresnel lens 1 of Embodiment 1, all lens surfaces 21 can be configured from parts of elliptical cones 30, respectively. However, when all lens surfaces 21 are configured from parts of elliptical cones 30, respectively, the lens surface 21 in the central lens portion 1a includes an apex P of an elliptical cone 30 and the curved surface becomes discontinuous in the apex P, and therefore, it is difficult for a light beam, passing through the apex P, to be collected on a focal point F.

On the other hand, in the Fresnel lens 1 of the present embodiment, the lens surface 21 located on the center among the plurality of lens surfaces 21 (that is, the lens surface 21 in the central lens portion 1a) is configured from the part of the above-mentioned hyperboloid 25.

Therefore, the Fresnel lens 1 of the present embodiment can further reduce aberration as compared with that of Embodiment 1, and the focusing performance can be improved. Accordingly, when the Fresnel lens 1 of the present embodiment is applied to the sensor device that has been explained in Embodiment 1, the sensitivity can be improved.

Figure 6:
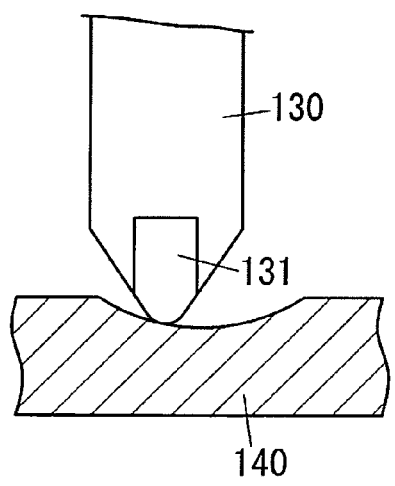
FIG. 6A is an explanatory diagram of a method of producing the Fresnel lens according to Embodiment 2 of the present invention.
FIG. 6B is an explanatory diagram of a method of producing the Fresnel lens according to Embodiment 2 of the present invention.
Figure 6:
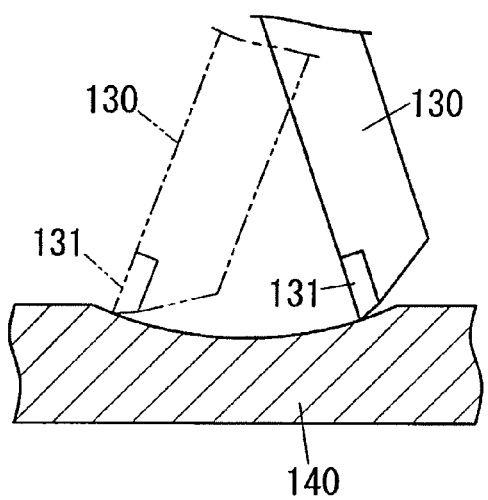

In the Fresnel lens 1 of the present embodiment, the lens surface 21 in the central lens portion 1a is configured from the part of the hyperboloid 25, thereby being capable of reducing aberration, as compared with that configured from a part of an aspheric surface other than the hyperboloid 25. In a case where the lens surface 21 in the central lens portion 1a is configured from the part of the hyperboloid 25, when a metal mold for the Fresnel lens 1 is produced, processing can be performed by reciprocating a cutting tool 130 while inclining a cutting face 131 perpendicular to the curved surfaces according to the lens surfaces 21 as shown in FIGS. 6A and 6B. In this case, the processing can be performed as far as a nose radius of the cutting tool 130 is smaller than the curvature radius of the hyperboloid 25, and hence the processing time can be reduced even when the lens surface 21 in the central lens portion 1a are the part of the hyperboloid 25.

Here, in the Fresnel lens 1 of the present embodiment, the lens surface 21 in the central lens portion 1a is not limited to the hyperboloid 25. As long as the lens surface 21 in the central lens portion 1a is an aspheric surface having an axis of symmetry inclined with respect to a lens thickness direction and having continuously changing curvature, the focusing performance can be further improved as compared with Fresnel lens 1 of Embodiment 1. In short, in the Fresnel lens 1, preferably, a lens surface 21 located on a center among the plurality of lens surfaces 21 is configured from a part of an aspheric surface with continuously changing curvature, and then any normal line intersecting with the lens surface 21 located on the center configured from a part of the aspheric surface among normal lines of respective points on the first surface 10 is non-parallel (that is, inclined) to an axis of symmetry of the aspheric surface corresponding to lens surface 21 located on the center with which the any normal line intersects (in a case where the aspheric surface is a hyperboloid 25, the axis of symmetry is a rotation axis OP1 of the hyperboloid 25). Thereby, the focusing performance can be improved. In this case, in the Fresnel lens 1, the axis of symmetry of the aspheric surface should be non-parallel to normal lines of respective points on a projection domain formed in the first surface 10 when the lens surface 21 located on the center is projected in a direction parallel to a central axis of the first surface 10.

Similarly to the Fresnel lens 1 of Embodiment 1, in the Fresnel lens 1 of the present embodiment, the line of intersection of the elliptical cone 30 and the hyperboloid 25 inscribed in the elliptical cone 30 is preferably intersect with the mountain portion 11b. In the Fresnel lens 1 shown in FIGS. 5A and 5B, the lines of intersection of the elliptical cones 30 and the hyperboloids 25 inscribed in the elliptical cones 30 exist on a plane surface 15 which is orthogonal to the lens thickness direction (that is, parallel to the first surface 10 configured from the plane surface), and which has a height from a valley of the mountain portion 11b of each orbicular zone-shaped lens portion 1b that is a half of the maximum height of the mountain portion 11b. Therefore, in the Fresnel lens 1 of the present embodiment, light beams passing on the intersections of the lens surfaces 21 and the plane surface 15 are collected on the focal point F, as shown in FIG. 5B.

Figure 5:
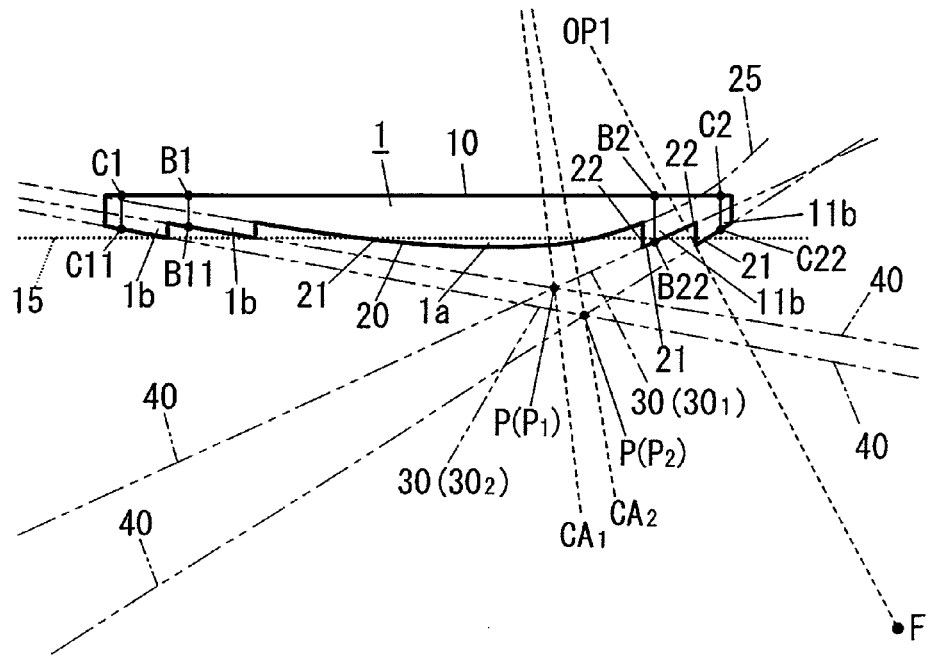
FIG. 5A is a cross-sectional view of a Fresnel lens according to Embodiment 2 of the present invention.
FIG. 5B is an explanatory diagram of a traveling path of a light beam in the Fresnel lens according to Embodiment 2 of the present invention.
Figure 5:
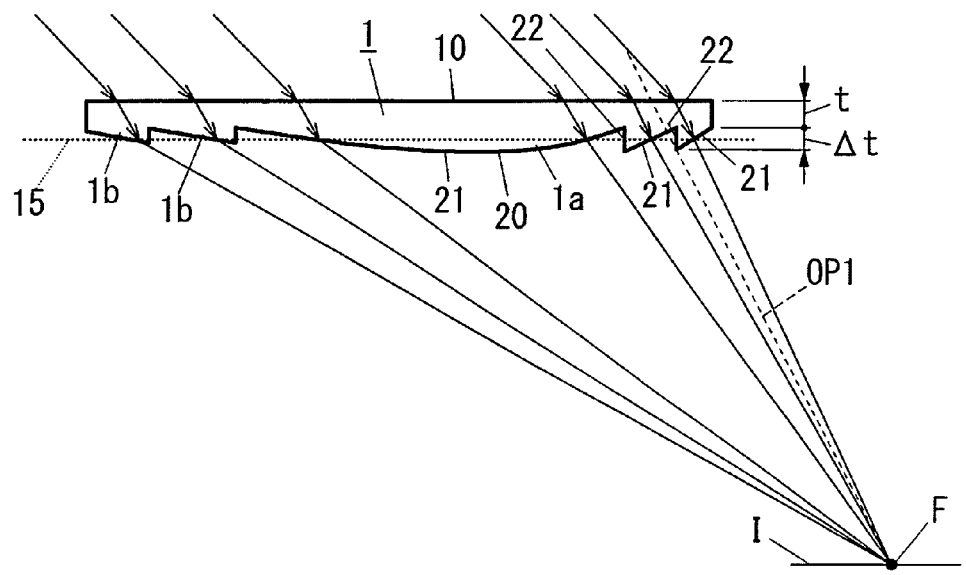

In the Fresnel lens 1 in FIGS. 5A and 5B, assuming that a rectangular coordinate system, in which the focal point F is employed as an origin, the rotation axis OP1 of the hyperboloid 25 is employed as a z-axis, and x-axis and a y-axis are orthogonal to the z-axis, is defined, the hyperboloid 25 that becomes the lens surface 21 of the central lens portion 1a is represented by the above-mentioned Formula (1). Further, assuming that rectangular coordinate systems, in which the apexes $P_1$ and $P_2$ are employed as origins, the central axes $CA_1$ and $CA_2$ are employed as z-axes, x-axes are specified along major axis directions of ellipses in cross-sections orthogonal to the z-axes, and y-axes are specified along minor axis directions, and are defined, the elliptical cones $30_1$ and $30_2$ can be represented by the above-mentioned Formula (6).

As an example of the Fresnel lens 1, a lens including a central lens surface 21 configured from a part of a hyperboloid 25, and five lens surfaces 21 each configured from a part of a side surface of an elliptical cone 30 is exemplified. In the Fresnel lens 1 of this example, the five elliptical cones 30 corresponding to the lens surfaces 21 that are a first orbicular zone to a fifth orbicular zone are represented as elliptical cones $30_1$ to $30_5$, respectively. In the Fresnel lens 1 of this example, in a case where a thickness t of a base portion configured from a portion other than each mountain portion 11b is 0.5 mm, a height (lens step) Δt of the mountain portion 11b on a point closest to a focal point F in each orbicular zone-shaped lens portion 1b is 0.05 mm, and polyethylene with a refractive index of 1.53 is employed as a lens material, values of coefficients a, b and c in Formula (1) or (6) are shown in the following Table 3. Table 3 shows values of a, b and c in Formula (1) as to the hyperboloid 25, and shows values of a, b and c in Formula (6) as to the elliptical cones $30_1$ to $30_5$. However, the coefficients a, b and c shown in Table 3 are the values obtained under a precondition that a distance from an image surface I parallel to the first surface 10 of the Fresnel lens 1 to the first surface 10 is 5.5 mm, and light beams incident at an incident angle of 45 degrees are collected on the focal point F.

TABLE 3

| Lens Surface | Coefficient a | Coefficient b | Coefficient c |
|---|---|---|---|
| Hyperboloid 25 | 2.40 | 2.78 | 3.67 |
| Elliptical Cone $30_1$ | 13.53 | 9.83 | 1.73 |
| Elliptical Cone $30_2$ | 10.54 | 7.78 | 1.74 |
| Elliptical Cone $30_3$ | 8.92 | 6.68 | 1.75 |
| Elliptical Cone $30_4$ | 7.87 | 5.97 | 1.76 |
| Elliptical Cone $30_5$ | 7.11 | 5.47 | 1.77 |

In a case where light beams incident at an incident angle of 45 degrees with respect to the first surface 10 are collected on the focal point F, an angle formed by the rotation axis OP1 of the hyperboloid 25 of the central lens portion 1a and the normal line of the first surface 10 should be 27.5 degrees according to Snell's law. That is, the rotation axis OP1 should be inclined by 27.5 degrees with respect to the normal line of the first surface 10. The central axes of the lens surfaces 21 of the second surface 20 intersecting with the normal lines are inclined with the normal lines of the respective points on the first surface 10. $\theta_1$ denotes an angle formed by each of the normal lines B1-B11 and B2-B22 intersecting with the lens surface 21 which is the first orbicular zone closest to the central lens surface 21, and the central axis $CA_1$ of the elliptical cone $30_1$. $\theta_2$ denotes an angle formed by each of the normal lines C1-C11 and C2-C22 intersecting with the lens surface 21 which is the second orbicular zone second closest to the central lens surface 21, and the central axis $CA_2$ of the elliptical cone $30_2$. Similarly, assuming that $\theta_3$ denotes an angle formed by the normal line intersecting with the lens surface 21 which is the third orbicular zone, and the central axis $CA_3$ of the elliptical cone $30_3$, $\theta_4$ denotes an angle formed by the normal line intersecting with the lens surface 21 which is the fourth orbicular zone, and the central axis $CA_4$ of the elliptical cone $30_4$, and $\theta_5$ denotes an angle formed by the normal line intersecting with the lens surface 21 which is the fifth orbicular zone, and the central axis $CA_5$ of the elliptical cone $30_5$, values of $\theta_0$ to $\theta_5$ are shown in the following Table 4.

TABLE 4

| | |
|---|---|
| $\theta_1$ | 1.67° |
| $\theta_2$ | 2.68° |
| $\theta_3$ | 3.64° |
| $\theta_4$ | 4.56° |
| $\theta_5$ | 5.43° |

It is understood from Table 4 that in the Fresnel lens 1, the angle, which is formed by a normal line of each point on the first surface 10 and a central axis of each lens surface 21 of the second surface 20 with which the normal line intersects, becomes larger as a orbicular zone-shaped lens portion 1b is located further outside.

Figure 7:
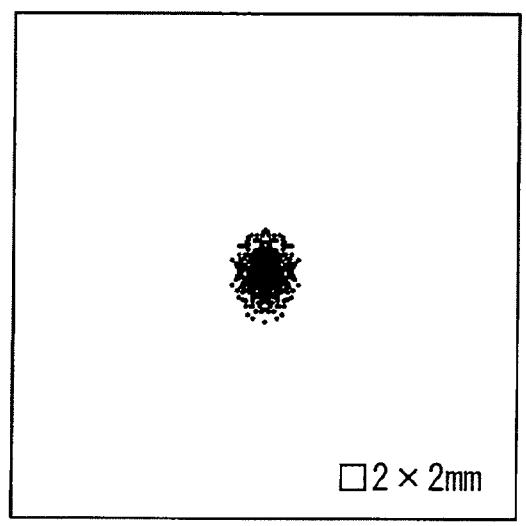
FIG. 7 is a spot diagram of said Fresnel lens.

FIG. 7 shows a spot diagram of the focal point F of this Fresnel lens 1. FIG. 7 shows a spot diagram in the range of 2*2 mm employing the focal point F as a center. The size of a focal spot should be less than or equal to the size of the photoelectric conversion element arranged so as to correspond to the focal point F of the Fresnel lens 1 (here, 0.6*0.6 mm or less). When comparing FIG. 3 with FIG. 7, it is understood that the aberration of the Fresnel lens 1 of the present embodiment can be reduced as compared with that of the Fresnel lens 1 of Embodiment 1.

In the Fresnel lens 1, the lens surface 21 of at least one orbicular zone-shaped portion 1b among a plurality of the orbicular zone-shaped lens portions 1b is configured from a part of a side surface of an elliptical cone 30, thereby being capable of suppressing occurrence of off-axis aberration in a case of utilizing incident light obliquely incident upon the first surface 10 from the outside world, and reducing the cost.

(Embodiment 3)

Hereinafter, a Fresnel lens 1 according to the present embodiment will be described with reference to FIGS. 8A and 8B. A basic configuration of a Fresnel lens 1 according to the present embodiment is substantially similar to that of Embodiment 2, the difference therebetween being in that the first surface 10 is a curved surface that is convex toward a side opposite to the second surface 20. In the Fresnel lens 1 of the present embodiment, the first surface 10 is configured from a part of a spherical surface having a large curvature radius, but is not limited to the part of the spherical surface.

In the Fresnel lens 1 of Embodiment 2, in a case where polyethylene is employed as a lens material, the first surface 10 is a plane surface. As a result, sink marks or waviness occur due to cooling of the injection molding, shrinkage unevenness caused during a solidification process, or the like, and appearance may be damaged. Further, for example, in a case where of equipping an apparatus such as a television or an air conditioner with the sensor device shown in FIGS. 4A to 4C, the Fresnel lens 1 configures a part of the appearance of the apparatus. Therefore, in order not to damage the design of the apparatus, preferably, the first surface 10 is formed so as to be substantially flush with a portion on the periphery of the first surface 10 on a surface of the apparatus.

Figure 8A:
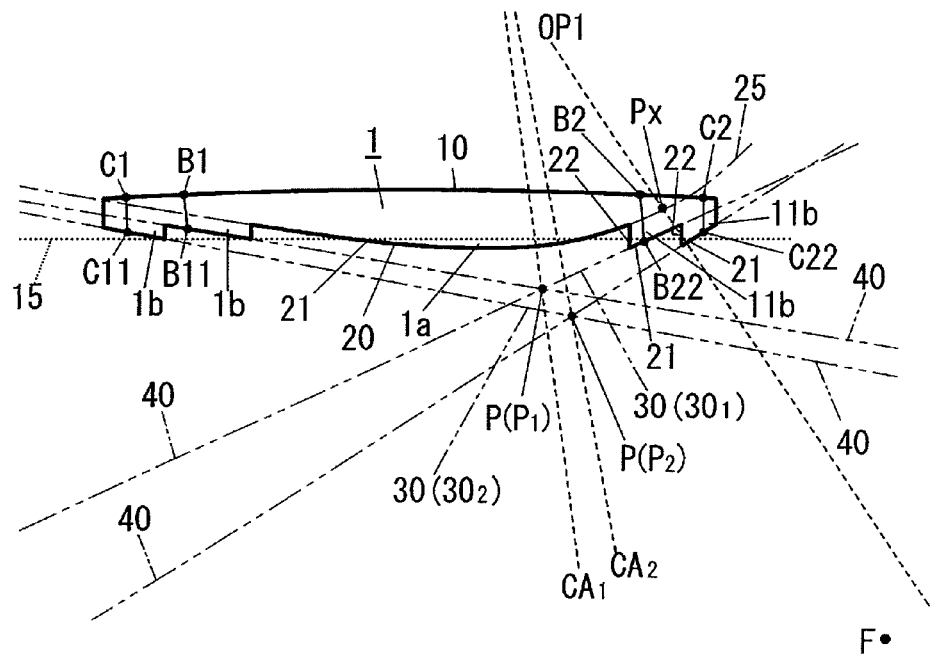
FIG. 8A is a cross-sectional view of a Fresnel lens according to Embodiment 3 of the present invention.
Figure 8B:
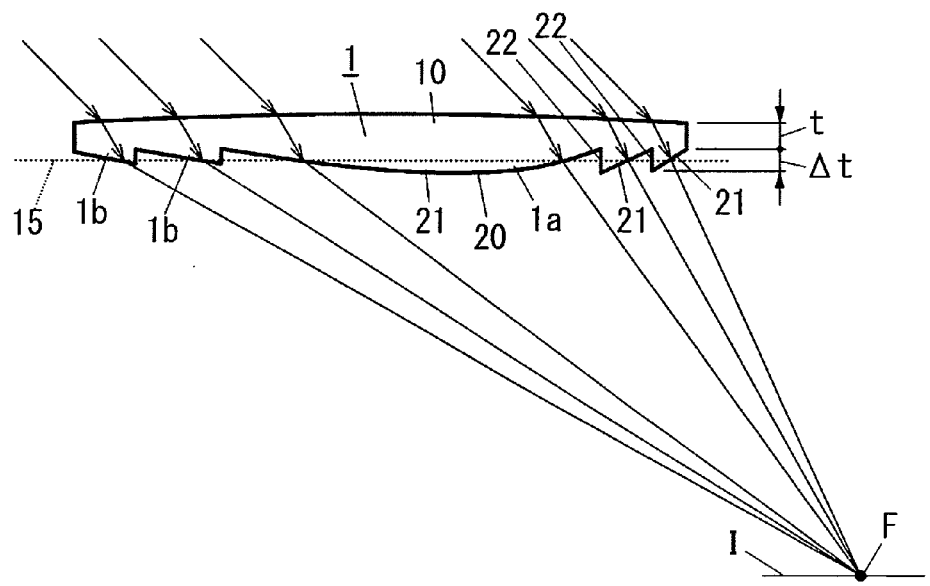
FIG. 8B is an explanatory diagram of a traveling path of a light beam in the Fresnel lens according to Embodiment 3 of the present invention.

So, in a case of employing polyethylene as the lens material and producing the lens by injection molding, the Fresnel lens 1 is preferably configured such that a curved surface has a large curvature radius (curved surface with small curvature), as shown in FIGS. 8A and 8B. In this case, the lens thickness direction is a normal line direction of each point on the first surface 10. In the Fresnel lens 1 of the present embodiment, the first surface 10 is configured to be a curved surface that is convex toward a side opposite to the second surface 20, thereby being capable of suppressing a direction of waviness in one direction, and preventing appearance from being damaged. In addition, the Fresnel lens 1 is preferably configured such that the first surface 10 has a curvature radius larger than the central lens surface 21 configured from a part of the hyperboloid 25 having an aspheric surface, and is a smoothly curved surface that is convex toward the side opposite to the hyperboloid 25.

In the Fresnel lens 1 of the present embodiment, when the curvature of the first surface 10 is designed in a range where an off-axis aberration does not exceed an allowable value (less than or equal to the size of the photoelectric conversion element), polyethylene is employed as the lens material, and occurrence of sink marks or waviness can be suppressed while suppressing occurrence of off-axis aberrations. Further, when the first surface 10 that is a surface of appearance of the Fresnel lens 1 is configured so as to have the same curvature as a portion on the periphery of the first surface 10 on a surface of the apparatus, the design of the apparatus can be enhanced.

In the Fresnel lens 1 of the present embodiment, while the lens surface 21 of the central lens portion 1a is configured from a part of a hyperboloid 25 similarly to Embodiment 2, in a case where the rotation axis OP1 of the hyperboloid 25 is inclined by 27.5 degrees similarly to an example of Embodiment 2, the off-axis aberration becomes larger with respect to light beams incident at an incident angle of 45 degrees. Therefore, as the Fresnel lens 1 of the present embodiment, in a case where the first surface 10 is configured from a part of a spherical surface, the rotation axis OP1 of the hyperboloid 25 is further inclined while rotating about the apex $P_x$ of the hyperboloid 25 in an xz plane of a rectangular coordinate system defined in Embodiment 1 as to this hyperboloid 25, thereby being capable of reducing the off-axis aberration.

The Fresnel lens 1 of the present embodiment is preferably configured such that lines of intersection of the elliptical cones 30 and the hyperboloids 25 inscribed in the elliptical cones 30 intersect with the mountain portions 11b, similarly to the Fresnel lenses 1 of Embodiments 1 and 2. In the Fresnel lens 1 in FIGS. 8A and 8B, the lines of intersection of the elliptical cones 30 and the hyperboloids 25 inscribed in the elliptical cones 30 exist on a plane surface 15 which has a height from a valley of the mountain portion 1ib of each orbicular zone-shaped lens portion 1b that is a half of the maximum height of the mountain portion 11b. Therefore, in the Fresnel lens 1 of the present embodiment, light beams passing on the intersections of the lens surfaces 21 and the plane surface 15 are collected on the focal point F, as shown in FIG. 8B.

In the Fresnel lens 1 of FIGS. 8A and 8B, assuming that a rectangular coordinate system, in which the focal point of the hyperboloid 25 is employed as an origin, the rotation axis OP1 is employed as a z-axis, and an x-axis and a y-axis are orthogonal to the z-axis, is defined, the hyperboloid 25 of the central lens portion 1a is represented by the above-mentioned Formula (1). Assuming that rectangular coordinate systems, in which the apexes $P_1$ and $P_2$ are employed as origins, the central axes $CA_1$ and $CA_2$ are employed as z-axes, and x-axes are specified along major axis directions of ellipses in cross-sections orthogonal to the z-axes and y-axes are specified along minor axis directions, are defined, the elliptical cones $30_1$ and $30_2$ can be represented by the above-mentioned Formula (6).

Here, as an example of the Fresnel lens 1, a lens including a central lens surface 21 configured from a part of a hyperboloid 25, and five lens surfaces 21 each configured from a part of a side surface of an elliptical cone 30 is exemplified. In the Fresnel lens 1 of this example, the five elliptical cones 30 corresponding to the lens surfaces 21 that are a first orbicular zone to a fifth orbicular zone are represented as elliptical cones $30_1$ to $30_5$. In the Fresnel lens 1 of this example, in a case where the first surface 10 is configured from a part of a spherical surface having a curvature radius of 100 mm, a minimum height t of a base portion configured from a portion other than each mountain portion 11b is 0.5 mm, a height (lens step) Δt of the mountain portion 11b on a point closest to a focal point F in each orbicular zone-shaped lens portion 1b is 0.05 mm, and polyethylene with a refractive index of 1.53 is employed as a lens material, values of coefficients a, b and c in Formula (1) or Formula (6) are shown in the following Table 5. Here, Table 5 shows values of a, b and c in Formula (1) as to the hyperboloid 25, and shows values of a, b and c in Formula (6) as to the elliptical cone $30_1$ to $30_5$. The coefficients a, b and c shown in Table 5 are values obtained under a precondition that a distance from an image surface I of the Fresnel lens 1 to the plane surface parallel to the image surface I and being in contact with the first surface 10 is 5.5 mm, and light beams incident at an incident angle of 45 degrees are collected on the focal point F.

TABLE 5

| Lens Surface | Coefficient a | Coefficient b | Coefficient c |
|---|---|---|---|
| Hyperboloid 25 | 2.38 | 2.76 | 3.65 |
| Elliptical Cone $30_1$ | 13.24 | 9.74 | 1.74 |
| Elliptical Cone $30_2$ | 10.36 | 7.74 | 1.75 |
| Elliptical Cone $30_3$ | 8.78 | 6.66 | 1.76 |

TABLE 5-continued

| Lens Surface | Coefficient a | Coefficient b | Coefficient c |
|---|---|---|---|
| Elliptical Cone $30_4$ | 7.75 | 5.96 | 1.77 |
| Elliptical Cone $30_5$ | 7.01 | 5.46 | 1.78 |

Here, in the Fresnel lens 1, as to the hyperboloid 25 corresponding to the lens surface 21 of the central lens portion 1a, the rotation axis OP1 of the hyperboloid 25 of the central lens portion 1a of Embodiment 2 is inclined while rotating about the apex $P_x$ of the hyperboloid 25 in the xz plane by 2.5 degrees, thereby being capable of reducing an off-axis aberration. Further, the normal lines of the respective points on the first surface 10 are directed to a curvature center of the first surface 10, and are inclined with respect to the central axes $CA_1$ and $CA_2$ of the respective lens surfaces 21 of the second surface 20 with which the normal lines intersect. θ1 denotes an angle formed by the normal line of the image surface I, and the central axis $CA_1$ of the elliptical cone $30_1$ corresponding to the lens surface 21 which is the first orbicular zone. $\theta_2$ denotes an angle formed by the image surface I, and the central axis $CA_2$ of the elliptical cone 309 corresponding to the lens surface 21 which is the second orbicular zone. Similarly, assuming that $\theta_3$ denotes an angle formed by the normal line of the image surface I, and the central axis $CA_3$ of the elliptical cone $30_3$ corresponding to the lens surface 21 which is the third orbicular zone, $\theta_4$ denotes an angle formed by the normal line of the image surface I, and the central axis $CA_4$ of the elliptical cone $30_4$ corresponding to the lens surface 21 which is the fourth orbicular zone, and $\theta_5$ denotes an angle formed by the normal line of the image surface I, and the central axis $CA_5$ of the elliptical cone $30_5$ corresponding to the lens surface 21 which is the fourth orbicular zone, values of $\theta_0$ to $\theta_5$ are shown in the following Table 6.

TABLE 6

| | |
|---|---|
| $\theta_1$ | 4.55° |
| $\theta_2$ | 5.57° |
| $\theta_3$ | 6.54° |
| $\theta_4$ | 7.47° |
| $\theta_5$ | 8.36° |

Figure 9:
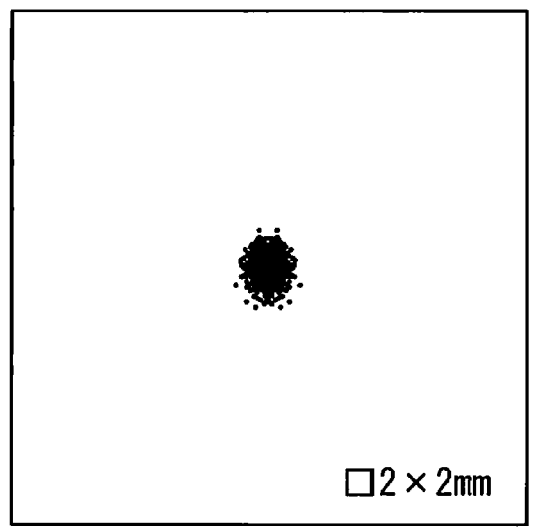
FIG. 9 is a spot diagram of the Fresnel lens according to Embodiment 3 of the present invention.
Figure 10:
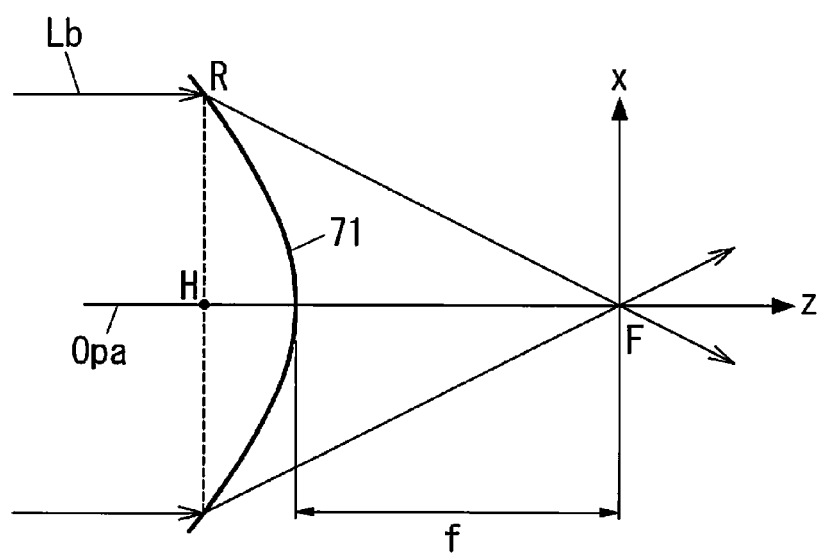
FIG. 10 is an explanatory diagram for illustrating the principle of a conventional aberration-free lens.
Figure 11:
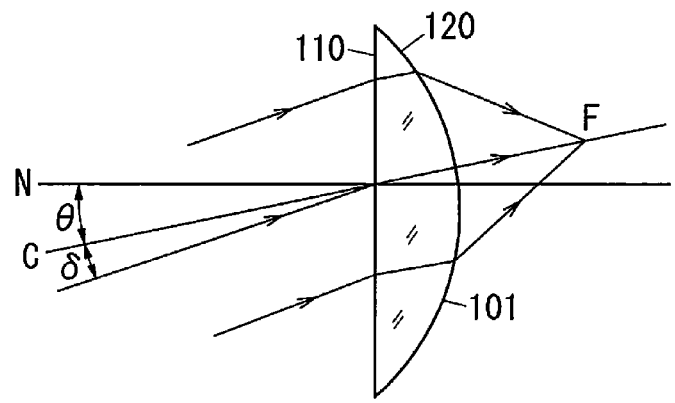
FIG. 11 is a cross-sectional view of a condenser lens of a conventional example.
Figure 12A:
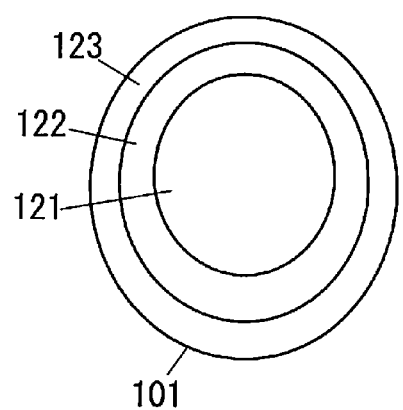
FIG. 12A is a plan view of a Fresnel lens of another conventional example.
Figure 12B:
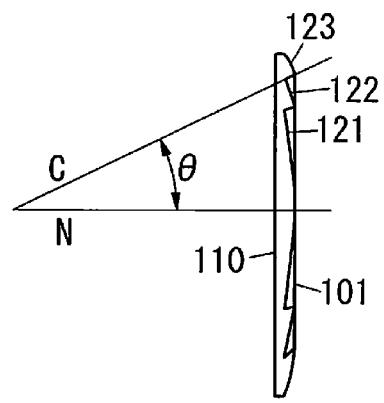
FIG. 12B is a cross-sectional view of the Fresnel lens of the another conventional example.
Figure 13:
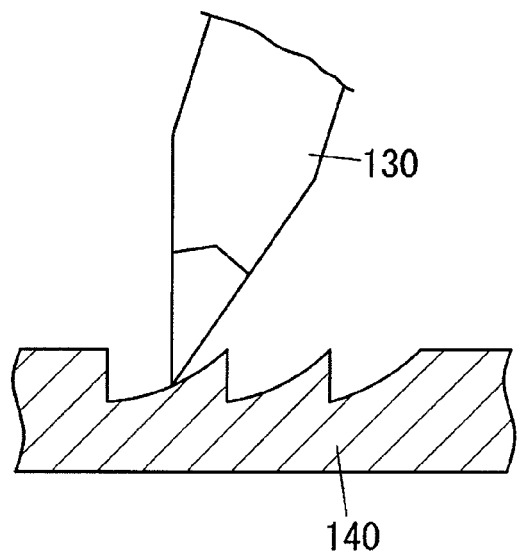
FIG. 13 is an explanatory diagram of a method of producing the Fresnel lens of the another conventional example.

FIG. 9 shows a spot diagram of the focal point F of this Fresnel lens 1. FIG. 9 shows a spot diagram in the range of 2*2 mm employing the focal point F as a center. The size of a focal spot should be less than or equal to the size of the photoelectric conversion element arranged so as to correspond to the focal point F of the Fresnel lens 1 (here, 0.6*0.6 mm or less). When comparing FIG. 7 with FIG. 9, it is understood that the aberration of the Fresnel lens 1 of the present embodiment is equivalent to that of the Fresnel lens 1 of Embodiment 2.

Although the present invention has been described with reference to certain preferred embodiments, numerous modifications and variations can be made by those skilled in the art without departing from the true spirit and scope of this invention, namely claims.

The invention claimed is:

1. A Fresnel lens comprising:
 a first surface; and
 a second surface being a reverse side surface of the first surface, the second surface having a plurality of lens surfaces,
 wherein at least one lens surface of the plurality of lens surfaces is configured as a portion of a side surface of an elliptical cone, and wherein a normal line intersecting with the at least one lens surface configured as the portion of the side surface of the elliptical cone, of normal lines of respective points on the first surface, is non-parallel to a central axis of the elliptical cone corresponding to the at least one lens surface with which the normal line intersects.

2. The Fresnel lens according to claim 1,
wherein at least two lens surfaces of the plurality of lens surfaces are configured as portions of side surfaces of elliptical cones having different central axes respectively, the at least two lens surfaces comprising an inner lens surface and an outer lens surface and the outer lens surface located further from a center of the Fresnel lens than the inner lens surface, and
wherein an angle formed by a first normal line of the first surface and the central axis of the elliptical cone of the outer lens surface is greater than an angle formed by a second normal line of the first surface and the central axis of the elliptical cone of the inner lens surface, the first normal line intersecting with the elliptical cone of the outer lens surface, the second normal line intersecting with the elliptical cone of the inner lens surface.

3. The Fresnel lens according to claim 1,
wherein a center lens surface located at a center of the plurality of lens surfaces is configured as a portion of an aspheric surface with a continuously changing curvature, and
wherein a normal line intersecting with the center lens surface, of the normal lines of the respective points on the first surface, is non-parallel to an axis of symmetry of the aspheric surface corresponding to the center lens surface.

4. The Fresnel lens according to claim 3,
wherein the aspheric surface is a hyperboloid.

5. The Fresnel lens according to claim 1,
wherein a lens material is polyethylene, and the first surface is a curved surface that is convex toward a side opposite to the second surface.

6. The Fresnel lens according to claim 2,
wherein a center lens surface located at a center of the plurality of lens surfaces is configured as a portion of an aspheric surface with a continuously changing curvature, and
wherein a normal line intersecting with the center lens surface, of the normal lines of the respective points on the first surface, is non-parallel to an axis of symmetry of the aspheric surface corresponding to the center lens surface.

7. The Fresnel lens according to claim 2,
wherein a lens material is polyethylene, and the first surface is a curved surface that is convex toward a side opposite to the second surface.

8. The Fresnel lens according to 3,
wherein a lens material is polyethylene, and the first surface is a curved surface that is convex toward a side opposite to the second surface.

9. The Fresnel lens according to claim 6,
wherein a lens material is polyethylene, and the first surface is a curved surface that is convex toward a side opposite to the second surface.

10. The Fresnel lens according to claim 1, wherein the at least one lens surface has a straight line shape when seen from a side of the Fresnel lens.

11. The Fresnel lens according to claim 1, wherein all of the plurality of lens surfaces are configured as side surfaces of elliptical cones.

* * * * *